(12) United States Patent
Rychahivskyy et al.

(10) Patent No.: US 8,967,875 B2
(45) Date of Patent: Mar. 3, 2015

(54) BEARING AND METHOD OF INHIBITING CRACK PROPAGATION IN A BEARING COMPONENT

(75) Inventors: Andriy Volodymyrovych Rychahivskyy, Herning (DK); Charlotte Vieillard, Woerden (NL); Xiaobo Zhou, Houten (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/990,015

(22) PCT Filed: Nov. 25, 2010

(86) PCT No.: PCT/EP2010/007149
§ 371 (c)(1),
(2), (4) Date: Aug. 13, 2013

(87) PCT Pub. No.: WO2012/069065
PCT Pub. Date: May 31, 2012

(65) Prior Publication Data
US 2013/0315520 A1 Nov. 28, 2013

(51) Int. Cl.
*F16C 33/66* (2006.01)
*F16C 33/76* (2006.01)
*F16C 33/32* (2006.01)
*F16C 33/62* (2006.01)

(52) U.S. Cl.
CPC ............... *F16C 33/664* (2013.01); *F16C 33/32* (2013.01); *F16C 33/62* (2013.01); *F16C 33/6637* (2013.01); *F16C 2300/42* (2013.01); *F16C 2202/60* (2013.01); *F16C 2223/42* (2013.01); *F16C 2206/40* (2013.01); *Y10S 384/9071* (2013.01)

USPC ........... 384/492; 384/477; 384/607; 384/625; 384/907.1

(58) Field of Classification Search
USPC ......... 384/462, 492, 548, 592, 606, 609, 625, 384/907.1, 913
See application file for complete search history.

(56) References Cited

U.S. PATENT DOCUMENTS

| 5,919,886 A | * | 7/1999 | Matsuda et al. ................. 528/42 |
| 6,869,222 B1 | * | 3/2005 | Fujiu et al. ..................... 384/462 |
| 2003/0185478 A1 | * | 10/2003 | Doll et al. ..................... 384/492 |

(Continued)

FOREIGN PATENT DOCUMENTS

| EP | 1450058 A2 | * | 8/2004 | ............. F16C 33/78 |
| EP | 1450058 A2 | | 9/2004 | |

(Continued)

OTHER PUBLICATIONS

C Chue: "Pitting formation on under rolling contact," Theoretical and Applied Fracture Mechanics, vol. 34, No. 1, Aug. 1, 2000, pp. 1-9, XP055005630, ISSN: 0167-8442, DOI: 10. 1016/50167-8442 (00) 00019-7, pp. 1,5,6,7; figure 14.

(Continued)

*Primary Examiner* — Marcus Charles
(74) *Attorney, Agent, or Firm* — Bryan Peckjian; SKF USA Inc. Patent Dept.

(57) ABSTRACT

A bearing includes a liquid lubricant and at least one ceramic component, which, during operation of the bearing, is subject to rolling contact load. A tribological surface of the at least one ceramic component is impregnated with a sealant, such that the liquid lubricant is prevented from entering discontinuities in the tribological surface.

9 Claims, 3 Drawing Sheets

(56) References Cited

U.S. PATENT DOCUMENTS

| | | | |
|---|---|---|---|
| 2007/0235701 A1* | 10/2007 | Chandran | 252/520.22 |
| 2007/0274619 A1* | 11/2007 | Woydt et al. | 384/461 |
| 2009/0180725 A1* | 7/2009 | Galehouse et al. | 384/492 |
| 2009/0245709 A1* | 10/2009 | Murakami | 384/548 |
| 2009/0290823 A1* | 11/2009 | Issler | 384/429 |
| 2010/0247012 A1* | 9/2010 | Reitz et al. | 384/462 |
| 2010/0255762 A1* | 10/2010 | Mandel et al. | 451/60 |

FOREIGN PATENT DOCUMENTS

| | | | | |
|---|---|---|---|---|
| EP | 1918597 | | 5/2008 | |
| EP | 1918597 A1 | * | 5/2008 | |
| GB | 2447855 A | | 10/2008 | |
| JP | 1112026 A | | 4/1989 | |
| JP | 01112026 A | * | 4/1989 | F16C 33/58 |
| JP | 09229077 A | * | 9/1997 | F16C 33/66 |
| JP | 11201174 A | * | 7/1999 | F16C 33/62 |
| WO | WO 9817931 A1 | * | 4/1998 | F16J 9/26 |

OTHER PUBLICATIONS

Bower A F: "The Influence of Crack Face Friction and Trapped Fluid on Surface Initiated Rolling Contact Fatigue Cracks," Journal of Tribology, American Society of Mechanical Engineers, New York, NY, US, vol. 110, No. 4, Oct. 1, 1988, pp. 704-711, XP009151532, ISSN: 0742-4787, D0I: 10. 1115/1 .3261717 pp. 1-6.

* cited by examiner

BEARING AND METHOD OF INHIBITING CRACK PROPAGATION IN A BEARING COMPONENT

CROSS-REFERENCE

This application is the U.S. national stage of International Application No. PCT/EP2010/007149 filed on Nov. 25, 2010, which is herein incorporated by reference in its entirety.

FIELD OF THE INVENTION

The present invention relates to a bearing comprising a liquid lubricant and a ceramic component which is subject to rolling contact load during operation of the bearing. The invention further relates to a method of inhibiting crack propagation in a lubricated bearing component that is subject to rolling contact loads.

BACKGROUND

Ceramic materials have several properties which are beneficial in bearing applications. Silicone nitride, for example, typically has a hardness twice that of bearing steel and is thus more wear-resistant. Ceramic materials are also lighter in weight and have a lower surface roughness than bearing steel, which is beneficial for reducing friction and energy losses. Bearings with ceramic components are therefore excellent in high-speed applications, such as in machine tools. In some examples, the bearing has steel bearing rings and one or more ceramic rolling elements. These bearing are known as hybrid bearings. In other examples, the bearing rings and the rolling elements are made of a ceramic material. Such full ceramic bearings are used, for example, in applications where weight must be minimized. Furthermore, ceramic materials are chemically inert and can withstand higher operating temperatures than bearing steel, which makes full ceramic bearings extremely suitable in aggressive operating environments.

A drawback of ceramic materials in bearing applications is that they are susceptible to surface crack initiated rolling contact fatigue. After manufacture, the tribological surface of e.g. a ceramic ball can exhibit some porosity, and may also contain inclusions and small surface cracks. Pores and inclusions can act as crack-initiation sites, and a surface crack which develops, or a pre-existing surface crack, may propagate under rolling contact fatigue, leading to bearing failure Bearings which comprise one or more ceramic components are sometimes lubricated with solid lubricant coatings such as molybdenum disulfide or graphite.

There are also numerous applications where the bearing is more suitably lubricated with a non-solid lubricant like oil or grease. It has been found that in such applications, there is a particular need to prevent or inhibit crack propagation.

DISCLOSURE OF THE INVENTION

In a component of a rolling element bearing, a crack will start propagating under rolling contact load when the total range of the effective stress intensity factor at the crack's tip exceeds a material-specific fatigue crack propagation threshold value in one rolling cycle. The present invention is based on the understanding that the likelihood of crack propagation is dependent on the sliding friction between faces of the crack. Specifically, the inventors have found that as the coefficient of friction between the crack faces increases, the total effective stress intensity factor decreases. As a result, it becomes less likely that the crack propagation threshold value will be exceeded.

In a bearing that is lubricated with a grease, for example, the oil film that separates the tribological surfaces of the bearing components will penetrate into discontinuities in the tribological surfaces. If a crack is present in the surface of a bearing component, the oil will effectively lubricate the crack faces, thereby reducing friction and increasing the likelihood of crack propagation. Thus, it is an object of the present invention to define a bearing comprising a liquid lubricant and at least one ceramic component, which has improved fatigue crack propagation resistance.

This object is achieved according to the invention by means of a bearing as defined in claim 1. Specifically, a tribological surface of the at least one ceramic component is impregnated with a sealant, so as to prevent the entry of the liquid lubricant into discontinuities in the tribological surface.

As mentioned, the surface of a ceramic bearing component may comprise discontinuities in the form of small cracks. Such cracks have an opening on the surface and generally extend along a parabolic path into the material subsurface. In a bearing according to the invention, the liquid lubricant is prevented from penetrating into the crack, meaning that a reduction in the coefficient of friction between the crack faces does not take place. Consequently, the crack is less likely to grow, leading to increased bearing life.

A bearing according to the invention may be lubricated with a grease. Grease is a semi-solid material comprising a thickener matrix and a base oil, whereby the base oil forms a lubricating film during bearing operation. Thus, it is the base oil which constitutes the liquid lubricant that is prevented from entering the surface discontinuities of the at least one ceramic component. The liquid lubricant in a bearing according to the invention may also be oil or water, or comprise a mixture of oil and water. The lubricant is selected depending on the application requirements.

The ceramic material of the at least one ceramic component is likewise selected on the basis of the application requirements. In high-load applications, bearing-grade silicon nitride is a suitable material. In low-load, low-speed applications, the ceramic component may comprise alumina. Other suitable ceramic materials include silicone carbide, tungsten carbide and zirconia (PSZ) and composites of the aforementioned materials.

Furthermore, a bearing according to the invention can be a radial bearing or a linear bearing. In some embodiments, the bearing is a hybrid rolling element bearing comprising steel bearing rings and one or more ceramic rolling elements. Suitably, a tribological surface of at least one rolling element is impregnated with the sealant. In further embodiments, the bearing is a full ceramic bearing comprising ceramic bearing rings and ceramic rolling elements, whereby an inner raceway and/or an outer raceway and/or a tribological surface of one or more rolling elements is impregnated with the sealant. In still further embodiments, the bearing is a linear bearing in the form of a ball screw or a roller screw, whereby the rolling elements of the ball/roller screw are made from a ceramic material and the tribological surface of at least one rolling element is impregnated with the sealant.

In all embodiments, it is advantageous if the tribological surface of each ceramic component is impregnated with a sealant in accordance with the invention. This will maximise the fatigue crack propagation resistance of each component and thereby maximise bearing life.

A variety of different materials may be used for the sealant. Suitably, the sealant may comprise a polymeric material, such as a cured epoxy resin or a cured phenolic resin. Preferably, a resin with a low viscosity is used, so that the sealant can penetrate into the full depth of any surface cracks and other discontinuities, prior to curing.

In a further development of the invention, the sealant used to impregnate the tribological surface of the at least one ceramic component has oil-repellent properties. An oil-repellent material is necessarily also water repellent, meaning that the sealant not only acts as a passive physical barrier, but also actively prevents the liquid lubricants mentioned above from entering the surface discontinuities. This is particularly advantageous if an outer surface of the sealed discontinuity were to become damaged during rolling contact. The liquid lubricant will be repelled from the damaged area, thereby providing the surface discontinuity with additional protection. Preferably, the sealant comprises a material which has a surface energy of between 5 and 50 mN/m.

An oil-repellent sealant may suitably comprise a cured polymeric material such as polytrtrafluoroethylene (PTFE), perfluoroalkoxy (PFA) or silicone. In the case of a rolling element such as a ceramic ball, the ball may be dipped in a bath of liquid polymer and then allowed to cure at temperature of e.g. 80-250° C. The heat-curing causes cross-linking of the polymer molecules, which provides the sealant with oil repellence. When the tribological surface is a raceway, the polymeric sealant may be sprayed on and then heat-cured. Any suitable method known in the art may be applied to impregnate the tribological surface.

After the polymeric sealant has been applied and cured, discontinuities (cracks, inclusions and pores) in the tribological surface will be filled with the cured sealant.

A thin film of the material will also remain on the tribological surface. When the sealant comprises PFA, for example, the thickness will be in the order of nanometers. Since this polymeric sealant is oil-repellent, its presence on the tribological surface is undesirable. Therefore, after impregnation, the oil-repellent sealant may be rubbed off using e.g. a cloth.

Alternatively, the polymeric sealant may simply be left in place. An additional advantage of the cured polymeric materials, such as the resins and oil-repellent polymers mentioned above, is that they are soft materials. Therefore, the sealant that remains on the tribological surface of a component will be quickly rubbed off during rolling contact with other components. After a brief period of running in, the tribological surface will possess good wettability, so that a lubricant film can be formed on that surface. When the sealant used is oil-repellent, the surface discontinuities remain oil-repellent.

The present invention also provides a method of inhibiting crack propagation in a component of a bearing that is subject to fatigue loading, whereby the bearing component has a tribological surface which, in operational use of the bearing, is wetted by a lubricant. According to the invention, the method comprises a step of impregnating the tribological surface with a sealant, such that the lubricant is prevented from entering discontinuities in the tribological surface.

As mentioned above, ceramic materials are particularly suitable for treatment in accordance with the invention. The residual porosity and small pre-existing cracks in the ceramic surface allows the surface to be impregnated. The method of the invention is not restricted to ceramic bearing components, however. A crack in any linear elastic material will propagate more quickly when the sliding friction between the crack faces is reduced by the presence of a liquid lubricant.

Therefore, the method of the invention can also be applied to components that are made of bearing steel. When new, the tribological surface of a bearing steel component is unlikely to contain discontinuities. But after the component has experienced rolling contact fatigue, the tribological surface may comprise discontinuities in the form of surface cracks. Thus, when a bearing is reconditioned, for example, the method of the invention may be advantageously applied to increase the fatigue crack propagation resistance of the reconditioned bearing.

In a preferred embodiment of the method, the step of impregnation comprises impregnating the tribological surface with an oil-repellent material. As mentioned above, a lubricant that comprises oil and/or water will then be actively prevented from entering the discontinuities.

Thus, a bearing according to the invention, or a bearing that has been treated in accordance with the method of the invention, has improved resistance to fatigue crack propagation. Other benefits will become clear from the following detailed description and accompanying drawings.

DETAILED DESCRIPTION

Figure 1A:
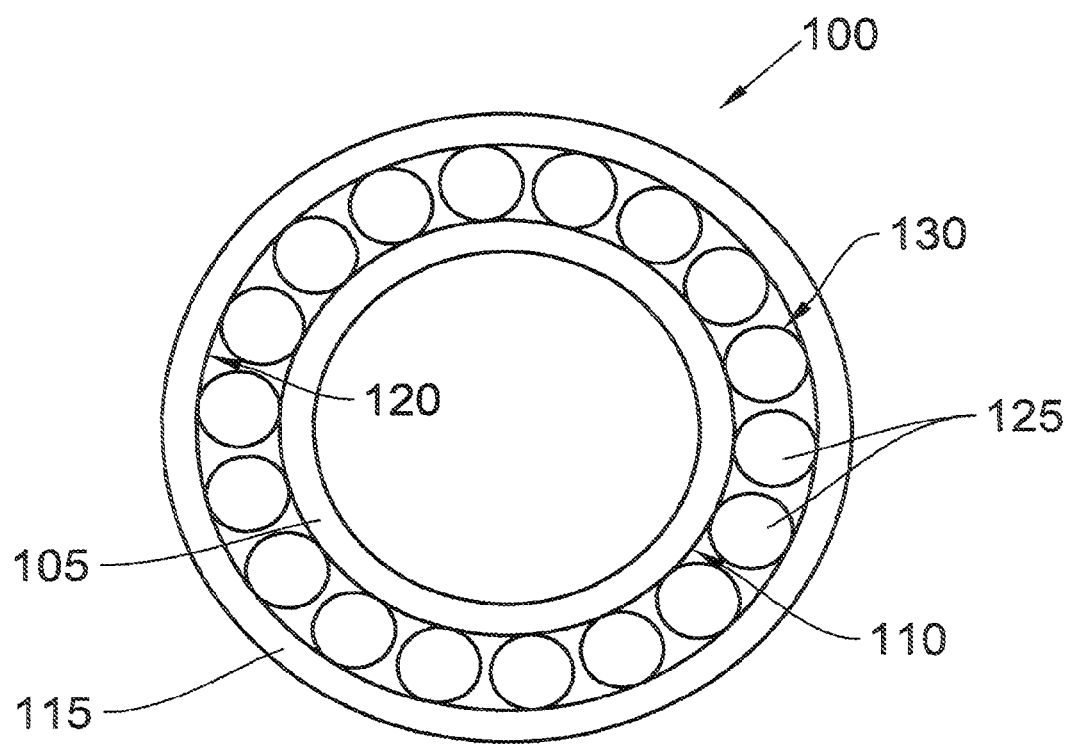
FIG. 1a shows a side view of a full-ceramic ball bearing according to the invention.

FIG. 1a shows a side a view of an example of a full ceramic ball bearing. The bearing 100 comprises an inner ring 105, an outer ring 115 and a plurality of balls 125 disposed between the bearing rings 105, 115, on an inner raceway 110 and an outer raceway 120. In this example, the bearing rings 105, 115 and each of the balls 125 are made of silicon nitride ($Si_3N_4$). In other examples, the bearing rings may be made from bearing steel. Further, the bearing 100 is lubricated with oil (not shown).

Figure 3A:
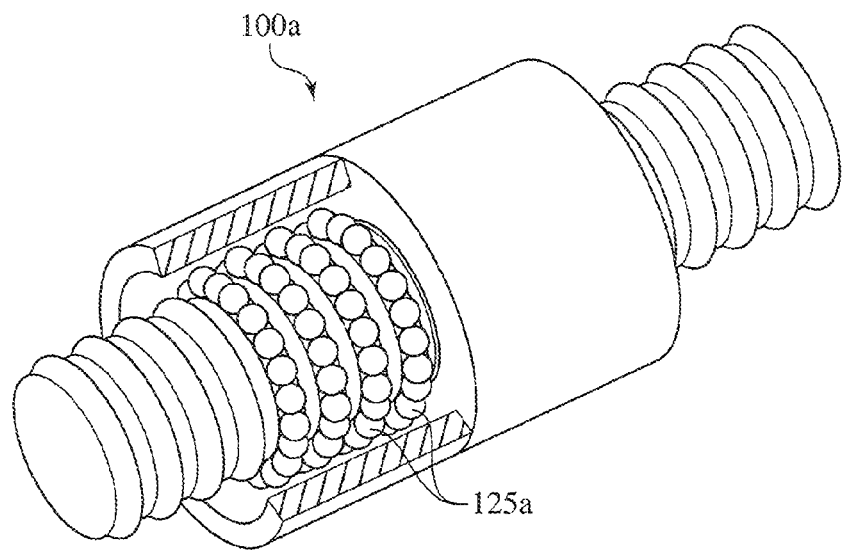
FIG. 3a shows a perspective view of a ball screw according to the invention.
Figure 3B:
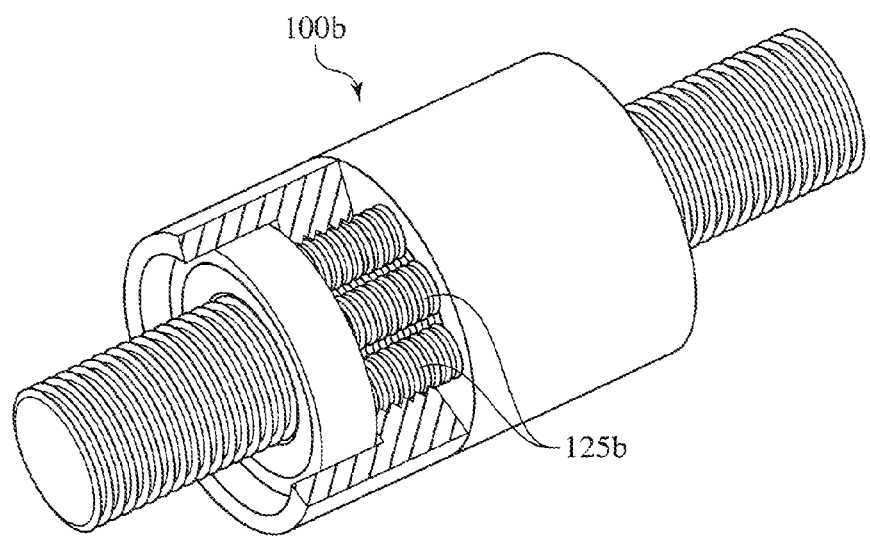
FIG. 3b shows a perspective view of a roller screw according to the invention.

According to the invention, a tribological surface of at least one silicon nitride component is impregnated with a sealant, so that oil is prevented from entering into discontinuities in the tribological surface. The term "tribological surface" should be understood as a surface of a component, which, during bearing operation, is in rolling contact with a surface of a further component. Thus, in the depicted example, the tribological surfaces include the inner raceway 110, the outer raceway 120 and an outer surface 130 of each ball 125. In the example of FIG. 1 a, each of the tribological surfaces 110, 120, 130 has been impregnated. In still further embodiments, the bearing is a linear bearing in the form of a ball screw 100a (FIG. 3a) or a roller screw 100b (FIG. 3b), whereby the rolling elements 125a and 125b, respectively, of the ball/roller screw 100a, 100b are made from a ceramic material and the tribological surface of at least one rolling element 125a and 125b is impregnated with the sealant.

One method of producing a ceramic bearing component is by means of hot isostatic pressing. Silicon nitride powder, for example, is densified under high pressure and temperature for several hours until full densification has taken place. The densified component has some residual porosity. In general, the fraction volume of pores is less than 0.1% for bearing-grade silicon nitride. At the surface of a component, e.g. a silicon nitride ball, a typical value for the surface porosity is 0.06%, whereby pore diameter can vary from 1 micron up to 10 microns. These values can differ for other ceramic materials.

Figure 1B:
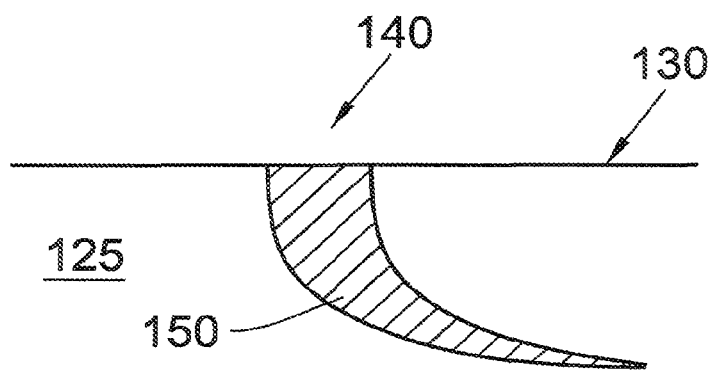
FIG. 1b shows a magnified view through an outer surface of a ball in the bearing of FIG. 1.

After densification, the tribological surface of the component is machined in order to achieve the precise tolerances required in bearing applications. Silicon nitride is a material with high hardness, but low toughness. In other words, it is a brittle material, and during machining it is possible for small surface cracks to be formed. An example of such a crack 140 is shown in FIG. 1b, which is a magnified view through the tribological surface 130 of a silicon nitride ball 125 from the example of FIG. 1a.

The crack 140 has a crack mouth which opens at the tribological surface 130 and extends into a subsurface of the ball in a parabolic fashion. In accordance with the invention, the tribological surface 130 has been impregnated with a sealant 150, such that the crack 140 is substantially filled by the sealant. Thus, lubricating oil that is present on the tribological surface 130 is prevented from penetrating into the crack.

In the depicted example, the sealant is a cured perfluoroalkoxy (PFA) polymer, which has a surface energy of 10-15 mN/m. In other words, the sealant material is oil repellent. This means that the sealant 150 not only acts as a passive physical barrier to the oil, but also actively inhibits its penetration into the crack 140. The advantage of impregnating the tribological surface 130 of the silicone nitride ball 125, so that lubricating oil is prevented from entering discontinuities 140 in the surface, will be explained with reference to FIG. 2.

The present inventors have found that crack growth rate in a linear elastic material is dependent on sliding friction between crack faces. The total range of the effective stress intensity factor (SIF) at a crack tip was calculated for a variety of different coefficients of friction, under three different levels of maximum contact pressure.

According to the generalized Paris' law, under fatigue stress, crack growth rate is proportional to the total range of SIF in one load cycle:

$$dL/dN = C^*[(\Delta K_{\mathit{eff}})^m - (K_{th})^m], \text{ where}$$

L is the crack length; N is the number of rolling cycles; $\Delta K_{\mathit{eff}}$ is the difference between the maximum and minimum values of the effective SIF in a mixed-mode regime; $K_{th}$ is the material's fatigue threshold value; and C and m are material constants.

A crack will start growing when the total effective SIF range $\Delta K_{\mathit{eff}}$ exceeds $K_{th}$, whereby the rate is proportional to $\Delta K_{\mathit{eff}}$. Therefore, the total effective SIF range $\Delta K_{\mathit{eff}}$ provides a measure of the crack's criticality.

Figure 2:
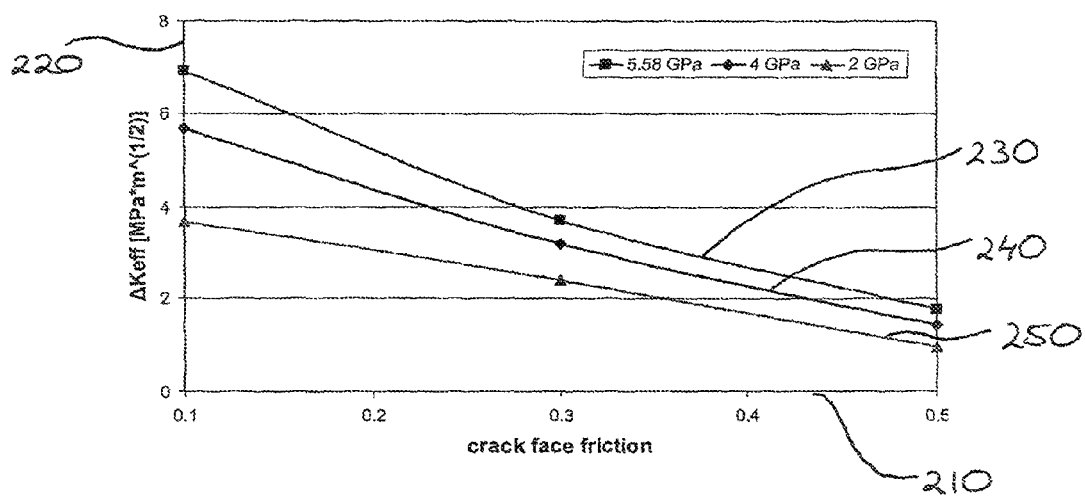
FIG. 2 shows a diagram of the total effective stress intensity factor against crack face friction for a crack in a ball under simulated load conditions.

A mixed mode fatigue analysis was performed for a silicon nitride ball of diameter 12.7 mm, having a surface crack extending parabolically to a certain depth, with a particular orientation. Further, it is assumed that a bearing inner ring passes over the crack in one loading cycle, with a predetermined contact coefficient of friction. The results of the calculation are shown in FIG. 2, whereby the x-axis 210 represents coefficient of sliding friction (dimensionless) between the crack faces and the y-axis 220 represents the total effective SIF range at the crack tip (MPa·m$^{1/2}$). Three curves are shown, whereby the first curve 230 represents the calculated results for a maximum contact pressure of 5.58 GPa; the second curve 240 represents the calculated results for a maximum contact pressure of 4 GPa and the third curve represents the calculated results for a maximum contact pressure of 2 GPa.

Under each of the three load conditions, the total effective SIF range decreases as the coefficient of sliding friction increases. In other words, a high coefficient of friction is beneficial in terms of reducing the likelihood that the fatigue threshold of silicon nitride, necessary for crack growth, will be exceeded.

In the oil-lubricated bearing of FIG. 1a, the presence of lubricating oil in the crack 140 depicted in FIG. 1b would greatly reduce the coefficient of sliding friction between the crack faces. Such a reduction is prevented in that the crack 140 is sealed by the sealant 150, thereby reducing the likelihood of crack growth.

In a silicon nitride ball or other ceramic bearing component, surface cracks can also develop during bearing operation. Such cracks are most likely to initiate at a surface discontinuity like a pore. In a bearing according to the invention, the pores in the tribological surface of the component are also impregnated with sealant. Again, the crack faces of a crack which starts at a pore do not become lubricated by oil, meaning there is no increase in the likelihood of crack growth.

Thus, a bearing according to the invention has improved fatigue crack propagation resistance, leading to longer bearing life.

A number of aspects/embodiments of the invention have been described. It is to be understood that each aspect/embodiment may be combined with any other aspect/embodiment. The invention may thus be varied within the scope of the accompanying patent claims.

REFERENCE NUMERALS

100 Ball bearing
105 Inner ring
110 Inner raceway
115 Outer ring
120 Outer raceway
125 Rolling element
130 Outer surface (tribological surface) of rolling element
140 Crack in tribological surface
150 Sealant
210 x-axis (coefficient of sliding friction between crack faces)
220 y-axis (total effective SIF range at crack tip)
230 first curve (max. contact pressure=5.58 GPA)
240 second curve (max. contact pressure=4 GPA)
250 third curve (max. contact pressure=2 GPA)

The invention claimed is:

1. A bearing comprising:
   a liquid lubricant, and
   at least one ceramic component which, during operation of the bearing, is subject to a rolling contact load, wherein a tribological surface of the at least one ceramic component is impregnated with a sealant, such that the liquid lubricant is prevented from entering discontinuities in the tribological surface, wherein the sealant comprises an oil-repellent material.

2. The bearing according to claim 1, wherein the liquid lubricant comprises at least one of lubricating oil and water.

3. The bearing according to claim 2, wherein the oil-repellent material has a surface energy of between 5 and 50 mN/m.

4. The bearing according to claim 3, wherein the sealant comprises a cured polymer.

5. The bearing according to claim 4, wherein the at least one ceramic component comprises a material selected from the group consisting of: silicon nitride, silicon carbide, alumina, and zirconia.

6. The bearing according to claim 5, wherein the bearing is a rolling element bearing and the tribological surface is at least one of an inner raceway, an outer raceway and an outer surface of a rolling element.

7. The bearing according to claim 5, wherein the bearing is a ball screw or a roller screw and the tribological surface is an outer surface of a rolling element.

8. A method of inhibiting crack propagation in a component of a bearing that is subject to fatigue loading, the bearing component having a tribological surface which, in operational use of the bearing, is wetted by a lubricant, wherein, the method comprises a step of impregnating the tribological surface with a sealant comprising an oil-repellent material such that discontinuities in the tribological surface are sealed to prevent ingress of the lubricant.

9. The method according to claim 8, wherein the bearing component comprises bearing steel or a bearing-grade ceramic material.

\* \* \* \* \*